(12) United States Patent
Bednarczyk et al.

(10) Patent No.: US 8,689,636 B2
(45) Date of Patent: Apr. 8, 2014

(54) OPTICAL FIBER TENSILE SCREENING METHOD AND DEVICE

(75) Inventors: David Andrew Bednarczyk, Wilmington, NC (US); Kirk Patton Bumgarner, Hampstead, NC (US); Aditya Kaimal, Wilmington, NC (US); Bruce Warren Reding, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 127 days.

(21) Appl. No.: 13/433,565

(22) Filed: Mar. 29, 2012

(65) Prior Publication Data

US 2013/0255397 A1    Oct. 3, 2013

(51) Int. Cl.
*G01L 1/24* (2006.01)

(52) U.S. Cl.
USPC .................................................. 73/800

(58) Field of Classification Search
USPC .................................................. 73/800
See application file for complete search history.

(56) References Cited

U.S. PATENT DOCUMENTS

| | | | | |
|---|---|---|---|---|
| 2,859,629 A | * | 11/1958 | Parker et al. | 74/89.22 |
| 3,643,497 A | * | 2/1972 | LeCompte | 73/794 |
| 5,076,104 A | * | 12/1991 | Glaesemann et al. | 73/830 |
| 5,410,396 A | * | 4/1995 | Rochester | 356/73.1 |
| 6,575,346 B2 | * | 6/2003 | Fenjac et al. | 226/42 |
| 6,834,553 B2 | | 12/2004 | Ravichandran et al. | |
| 7,832,675 B2 | * | 11/2010 | Bumgarner et al. | 242/474.7 |
| 7,997,158 B2 | * | 8/2011 | Grossart | 74/89.2 |
| 2003/0011759 A1 | | 1/2003 | Ravichandran et al. | |

* cited by examiner

*Primary Examiner* — Lisa Caputo
*Assistant Examiner* — Octavia Davis-Hollington
(74) *Attorney, Agent, or Firm* — Robert L Carlson

(57) ABSTRACT

A method and device for continuously testing the tensile strength of an optical fiber, wherein the incoming optical fiber is wrapped at least partially around a payout capstan, to an intermediate payout pulley, at least partially around the intermediate payout pulley, and back to the payout capstan. The optical fiber is then wound from the payout capstan to a tensile testing measurement component, and then to an uptake capstan. The optical fiber is wrapped at least partially around the uptake capstan, to an intermediate uptake pulley, at least partially around the intermediate uptake pulley, and back to the uptake capstan. The payout capstan and uptake capstan are operated at a desired rotational speed to continuously advance the optical fiber for tensile strength testing.

9 Claims, 3 Drawing Sheets

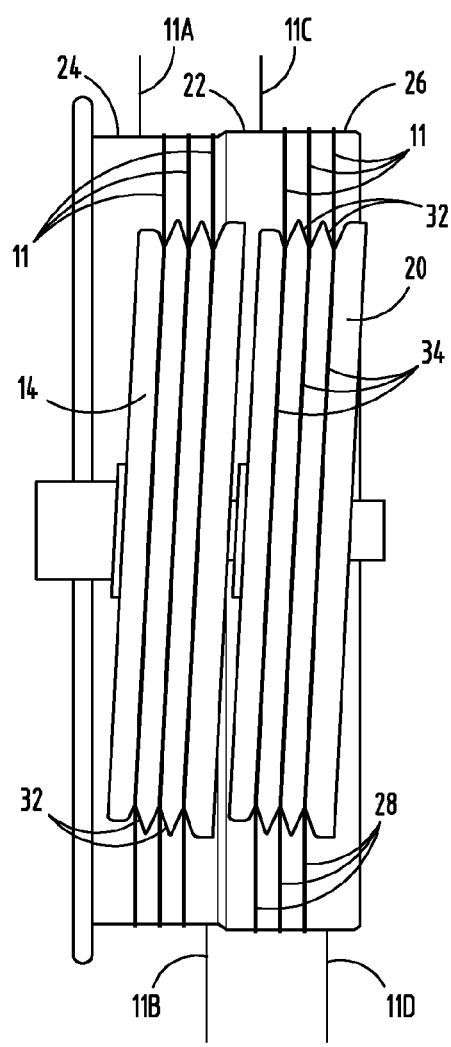
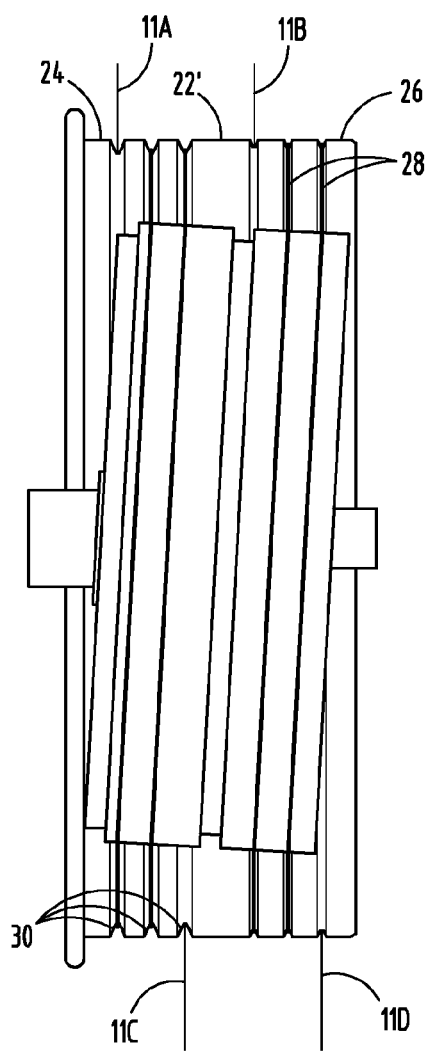
FIGURE 6
FIGURE 7

OPTICAL FIBER TENSILE SCREENING METHOD AND DEVICE

FIELD

The disclosed embodiments pertain to a method and device for continuously testing the tensile strength of an optical fiber.

BACKGROUND

Tensile testing of optical fibers is commonly carried out to ensure that optical fibers have the desired tensile strength for their applications, and to ensure that there are not anomalies or defects in the fiber which may affect its integrity.

In one method of screening or proof-testing optical fiber, a length of optical fiber is isolated between two capstan assemblies, each capstan assembly having a capstan pulley and a capstan belt, and then a tensile stress is applied to the isolated length of optical fiber. The capstan belt is used to hold the fiber in place and prevent fiber slip on the capstan pulley as the tensile stress is applied. When screening spliced optical fibers, where the coating has been stripped to splice bare glass ends, and then the bare glass is recoated with a layer of coating, or recoat, the increased compressive stress from the belt may result in coating defects at or near the splice joint.

Another method previously disclosed includes the use of multiple wraps of optical fiber around a capstan to isolate the portion of the optical fiber being tensile tested.

In each of these methods, whether a belt is used or whether multiple wraps are used around the capstan, the optical fiber is tested in an intermittent fashion, by advancing the fiber a given length, isolating the portion of the fiber between the capstans, and then testing the tensile strength of the length of fiber between the first and second capstans. When attempting to use tensile testing devices as described above in a continuous tensile testing method, the optical fiber is likely to be subject to slippage on the capstan, increased wear on the optical fiber and its coating as a result of the belt compressing the optical fiber against the capstan, and tangling or "webwalking" about the capstan.

SUMMARY

One embodiment is a method for continuously testing the tensile strength of an optical fiber. The incoming optical fiber is wrapped at least partially around a payout capstan, to an intermediate payout pulley, at least partially around the intermediate payout pulley, and back to the payout capstan. The optical fiber is then wound from the payout capstan to a tensile testing measurement component, and then to an uptake capstan. The optical fiber is wrapped at least partially around the uptake capstan, to an intermediate uptake pulley, at least partially around the intermediate uptake pulley, and back to the uptake capstan. The payout capstan and uptake capstan are operated at a desired rotational speed to continuously advance the optical fiber for tensile strength testing.

Another embodiment described herein includes an apparatus for use in carrying out the method. The system for continuously testing the tensile strength of the optical fiber includes a capstan and at least one intermediate pulley radially aligned with the capstan, having grooves around the circumference thereof to define lanes of travel for optical fiber around the circumference of the intermediate pulley. The system further includes a tensile testing measurement component.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 6 is a bottom view of an embodiment of a tensile testing device with the load pulley removed for clarity; and FIG. 7 is a bottom view of another embodiment of a tensile testing device with the load pulley removed for clarity.

DETAILED DESCRIPTION

Figure 1:
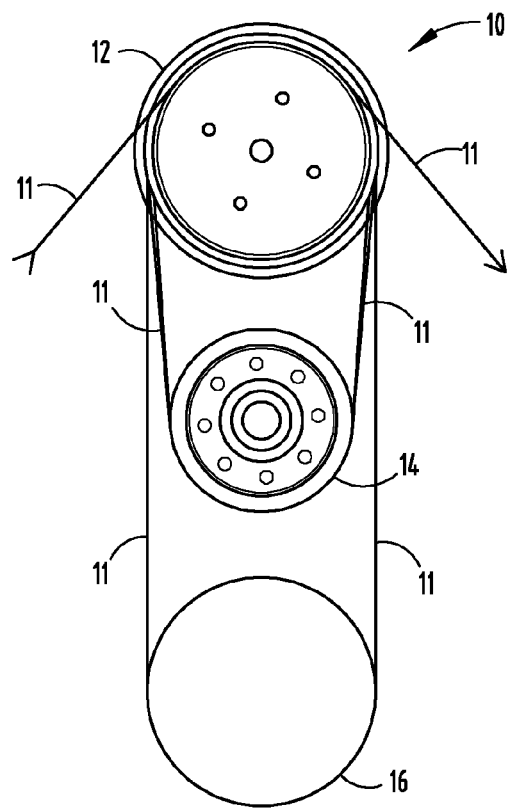
FIG. 1 is a side elevation view of one embodiment of a tensile testing device.

Reference will now be made in detail to the present preferred embodiments, examples of which are illustrated in the accompanying drawings. Whenever possible, the same reference numerals will be used throughout the drawings to refer to the same or like parts. One embodiment of the optical fiber tensile testing device is shown in FIG. 1, and is designated generally throughout by the reference numeral 10.

Referring to FIG. 1, a device for testing the tensile strength of an optical fiber 11 comprises a payout capstan 12 and an intermediate payout pulley 14 which are radially aligned with each other, an uptake capstan 18 and intermediate payout pulley 20 which are radially aligned with each other, and a tensile testing component 16 which can be spaced a distance away from the capstans 12, 18 and intermediate pulleys 14, 20. Payout capstan 12 and uptake capstan 18 are preferably of the same construction, except that the outer diameter of uptake capstan 18 is preferably relatively larger than the outer diameter of payout capstan 12.

As used herein, a "capstan" is a motorized or driven rotating element, which drives the movement of optical fiber 11, and a "pulley" is a rotating element which is rotated by the passage of optical fiber 11.

A method for continuously testing the tensile strength of an optical fiber 11 includes the steps of winding a length of optical fiber 11 at least partially around payout capstan 12, to intermediate payout pulley 14, and back to payout capstan 12;

winding optical fiber 11 from payout capstan 12 to tensile testing measurement component 16; winding optical fiber 11 from tensile testing measurement component 16 to an uptake capstan 18 (not shown in FIG. 1, directly behind payout capstan 12), at least partially around uptake capstan 18, to intermediate uptake pulley 20 (not shown in FIG. 1, directly behind intermediate payout pulley), and back to uptake capstan 18; operating payout capstan 12 and uptake capstan 18 at a desired rotational speed to continuously advance optical fiber 11; and screening the tensile strength of optical fiber 11. Alternatively, the uptake capstan 18 and intermediate uptake pulley 20 may be located in front of payout capstan 12 and intermediate payout pulley 14, depending on the direction of threading that is desired for the optical fiber 11.

According to one embodiment, optical fiber 11 is preferably wrapped multiple times around payout capstan 12 and intermediate payout pulley 14 prior to extending to tensile testing measurement component 16. Optical fiber is also preferably wrapped multiple times around uptake capstan 18 and intermediate uptake pulley 20 after leaving tensile testing measurement component 16. Most preferably, there are three wraps of optical fiber 11 around the relevant capstan 12, 18 and its associated intermediate pulley 14, 20. The multiple wraps increase the contact angle and contact surface area between the capstans 12, 18 and optical fiber 11, and thus increase the resultant tensile stress that the fiber 11 experiences by increasing the force applied by capstans 12, 18 in an outward direction onto fiber 11, until the tensile stress applied by capstans 12, 18 exceeds the maximum slip stress set point, to prevent slippage of optical fiber 11.

Figure 2A:
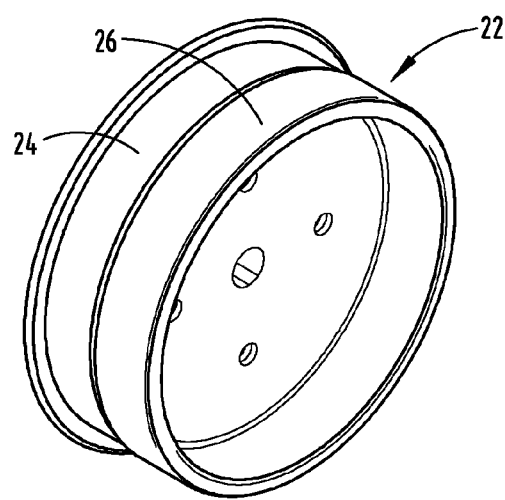
FIG. 2A is a front perspective view of an embodiment of a differential diameter capstan.
Figure 2B:
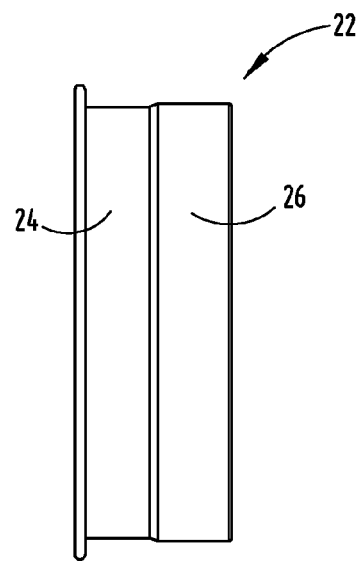
FIG. 2B is a side elevation view of the embodiment of a differential diameter capstan as shown in FIG. 2A.

According to one embodiment, one component for use in the method of screening optical fiber 11 comprises a differential diameter capstan 22, as shown in FIGS. 2A and 2B. The differential diameter capstan 22 includes a payout portion 24 and uptake portion 26, having different diameters, which, because they are part of the same capstan 22, are driven at the same rotational speed. Payout portion 24, as best shown in FIG. 2B, has a relatively smaller diameter than uptake portion 26. Tensile stress is applied to optical fiber 11 as a result of the differential diameters being driven at the same speed.

Differential diameter capstan 22 is used in place of a separate payout capstan 12 and uptake capstan 18, and when using a differential diameter capstan 22, optical fiber 11 is preferably wound around payout portion 24 and intermediate payout pulley 14 multiple times, then wrapped around tensile testing measurement component 16, and then wound multiple times around uptake portion 26 and intermediate uptake pulley 20.

When a separate payout capstan 12 and uptake capstan 18 are employed, the capstans 12, 18 are preferably provided with differing diameters and operated at the same speed. Alternatively, capstans 12, 18 could potentially have the same diameter, and be operated at differing rotational speeds to apply stress to optical fiber 11.

The use of intermediate pulleys 14, 20 in conjunction with capstans 12, 18 or differential diameter capstan 22 minimizes tangling of optical fiber 11 when multiple wraps are used, by directing optical fiber 11 to specific discrete lanes 28 about the circumference of capstans 12, 18 or differential diameter capstan 22, respectively, as shown in FIGS. 6 and 7. Ensuring that optical fiber 11 is directed into discrete lanes 28, with only one wrap of fiber 11 in each lane 28, reduces the opportunity of tangling of optical fiber 11, even when optical fiber 11 is continuously screened.

Figure 3A:
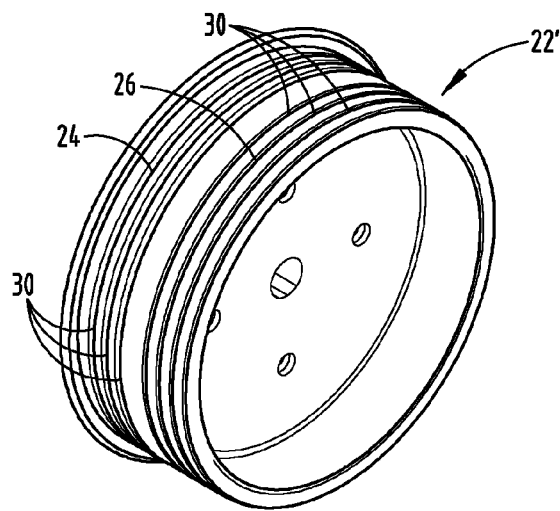
FIG. 3A is a front perspective view of an embodiment of a grooved differential diameter capstan.
Figure 3B:
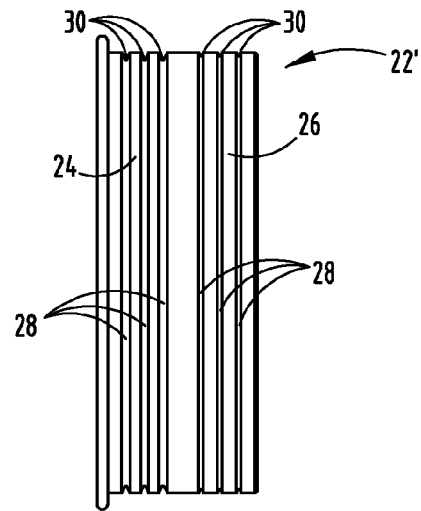
FIG. 3B is a side elevation view of the embodiment of the differential diameter capstan shown in FIG. 3A.

To facilitate continuous screening of optical fiber 11, certain additional features may also be incorporated to prevent tangling. First, as shown in the embodiment depicted in FIGS. 3A and 3B, grooves 30 may be provided about the circumference of a differential diameter capstan 22' to define lanes of travel 28 for optical fiber 11. As best shown in FIG. 3B, when grooves 30 are provided in the capstan 22', the differential in diameter can be created through the use of grooves 30 of varying depths. Grooves 30 may be V-shaped or U-shaped to receive optical fiber 11.

Figure 4A:
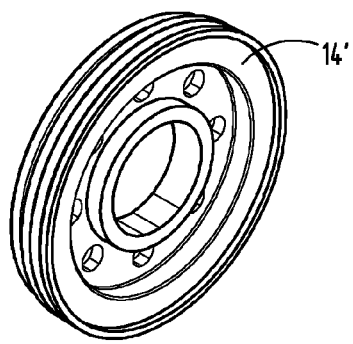
FIG. 4A is a front perspective view of an embodiment of a grooved intermediate pulley.
Figure 4B:
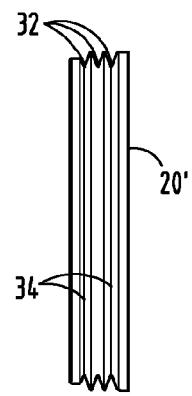
FIG. 4B is a side elevation view of the intermediate pulley shown in FIG. 4A.
Figure 5A:
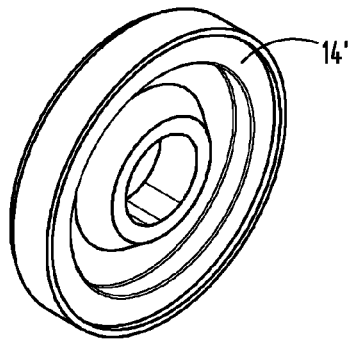
FIG. 5A is a front perspective view of an embodiment of an intermediate pulley.
Figure 5B:
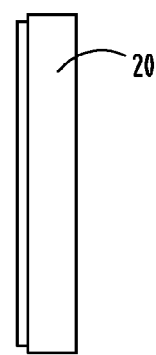
FIG. 5B is a side elevation view of the intermediate pulley shown in FIG. 5A.

Referring to FIGS. 4A and 4B, another feature that may optionally be included to prevent tangling of optical fiber 11 includes grooves 32 provided around intermediate pulley 14' or 20'. Similarly to grooves 30 described for use in the capstan, grooves 32 in intermediate pulleys 14', 20' aid in separating optical fiber 11 into discrete lanes 34 around intermediate pulleys 14', 20'. Intermediate pulleys 14' and 20' preferably have identical construction. (Also see FIG. 6.) As shown in FIGS. 5A, 5B and 7, intermediate pulleys 14, 20 can also be provided without grooves 34 around the circumference thereof according to another embodiment.

Another feature that may optionally be included to direct optical fiber 11 into discrete lanes is that intermediate pulleys 14, 14' 20 or 20' may be arranged at an angle with respect to the plane of the face of the associated capstan 12, 18, 22, or 22' as shown in FIGS. 6 and 7. The angle of offset is a function of the pulley diameter and the desired spacing between the fiber lanes. It will be 2.5 degrees for a pulley diameter of 4.5 inches and a spacing of 0.2 inches.

The features described herein to prevent tangling, namely, the capstan grooves 30, intermediate pulley grooves 32, and angling of intermediate pulleys 14, 20, can be used together or individually, in any combination.

Tensile testing measurement component is shown having a pulley with a load cell according to one embodiment. The load cell measures the tension applied to optical fiber 11. The screening of optical fiber 11 may also include visual inspection of fiber 11, or other automated inspection method to evaluate fiber 11 for structural or coating defects which might affect the integrity or tensile strength of optical fiber 11.

Referring now to FIG. 6, showing a bottom view of a multiple wrap system with tensile testing measurement component 16 removed for clarity, the wrapping of optical fiber 11 can be shown in greater detail. Incoming optical fiber 11A approaches payout portion 24 of differential diameter capstan 22. Optical fiber 11 is then wrapped multiple times around payout portion 24 to grooved intermediate payout pulley 14' and then back to payout portion 24. Optical fiber 11B then leaves payout portion 24 and extends to wrap around the tensile testing measurement component 16 (not shown in FIG. 6). Optical fiber 11C returns from tensile testing measurement component 16 to the uptake portion 26 of differential diameter capstan 22. Optical fiber 11 is then wrapped multiple times around uptake portion 26 to grooved intermediate payout pulley 20' and then back to uptake portion 26. Optical fiber 11D then exits uptake portion 26 to continue with any other processing or winding desired after tensile testing.

Once optical fiber 11 has been initially wound around the fiber path described above, optical fiber 11 is continuously advanced by driven differential diameter capstan 22 (or by payout capstan 12 and uptake capstan 18), such that optical fiber 11 is continuously passed around or past tensile testing measurement component 16, and is thus continuously screened for tensile strength. Screening may include application of a load or tension to optical fiber 11 by a loaded pulley which operates as the tensile testing measurement component 16 and measurement of the tension which the optical fiber 11 withstands, or may include observation of optical fiber 11 as it passes over or through tensile testing measurement component 16 to detect anomalies in its appearance or coating or after it has been subjected to the tensile stress.

FIG. 7 also shows a bottom view of a multiple wrap system with tensile testing measurement component 16 removed for clarity. FIG. 7 illustrates the use of intermediate pulleys 14, 20 without grooves 32 therein. As described above, the features used to prevent tangling of optical fiber 11 can be used in any desired combination.

Just as the functions of payout capstan 12 and uptake capstan 18 can be integrated into a single differential diameter capstan 22, the functions of intermediate pulleys 14 and 20 may also optionally be included in a single pulley if desired.

One embodiment of the method for continuously testing the tensile strength of an optical fiber 11 includes wrapping the incoming optical fiber at least partially around a payout capstan 12, to an intermediate payout pulley 14, at least partially around the intermediate payout pulley 14, and back to the payout capstan 12. The optical fiber 11 is then wound from the payout capstan to a tensile testing measurement component 16, and then to an uptake capstan 18. The optical fiber 11 is wrapped at least partially around the uptake capstan 18, to an intermediate uptake pulley 20, at least partially around the intermediate uptake pulley 20, and back to the uptake capstan 18. The payout capstan 12 and uptake capstan 18 are operated at a desired rotational speed to continuously advance the optical fiber 11 for tensile strength testing.

The method of testing the tensile strength of optical fiber 11 described herein allows for the continuous screening of the tensile strength of optical fiber 11 in a non-destructive manner, and permits testing of coated optical fibers 11 without the need for belts which apply a compressive force to the coated optical fibers 11 which may damage the fibers.

The foregoing description provides exemplary embodiments to facilitate an understanding of the nature and character of the claims. It will be apparent to those skilled in the art the various modifications to these embodiments can be made without departing from the spirit and scope of the appending claims.

What is claimed is:

1. A method for continuously testing the tensile strength of an optical fiber, comprising the steps of:
   winding the optical fiber at least partially around a payout capstan, to an intermediate payout pulley, and back to the payout capstan;
   winding the optical fiber from the payout capstan to a tensile testing measurement component;
   winding the optical fiber from the tensile testing measurement component to an uptake capstan, at least partially around the uptake capstan, to an intermediate uptake pulley, and back to the uptake capstan;
   operating the payout capstan and uptake capstan at a desired rotational speed to continuously advance the optical fiber; and
   screening the tensile strength of the optical fiber.

2. The method of claim 1, wherein the payout capstan and the uptake capstan have different diameters and are driven at the same rotational speed.

3. The method of claim 2, wherein the payout capstan and the uptake capstan are each portions of a single differential diameter capstan.

4. The method of claim 3, wherein the differential diameter capstan has at least one groove therein to receive the optical fiber.

5. The method of claim 4, wherein the intermediate pulleys each have at least one groove therein to receive the optical fiber as the optical fiber approaches the intermediate pulley and to feed the optical fiber leaving the intermediate pulley to a discrete lane around the circumference of the capstan.

6. The method of claim 5, wherein the intermediate pulleys are each arranged at an angle with respect to the plane of the capstan face.

7. The method of claim 3, wherein the intermediate pulleys each have at least one groove therein to receive the optical fiber as the optical fiber approaches the intermediate pulley and to feed the optical fiber leaving the intermediate pulley to a discrete lane around the circumference of the capstan.

8. The method of claim 1, wherein the intermediate pulleys are each arranged at an angle with respect to the plane of the capstan face in order to feed the optical fiber leaving the intermediate pulley into a discrete lane around the circumference of the capstan.

9. The method of claim 1, wherein the intermediate payout pulley and the intermediate uptake pulley are each portions of a single pulley.

\* \* \* \* \*